UNITED STATES PATENT OFFICE.

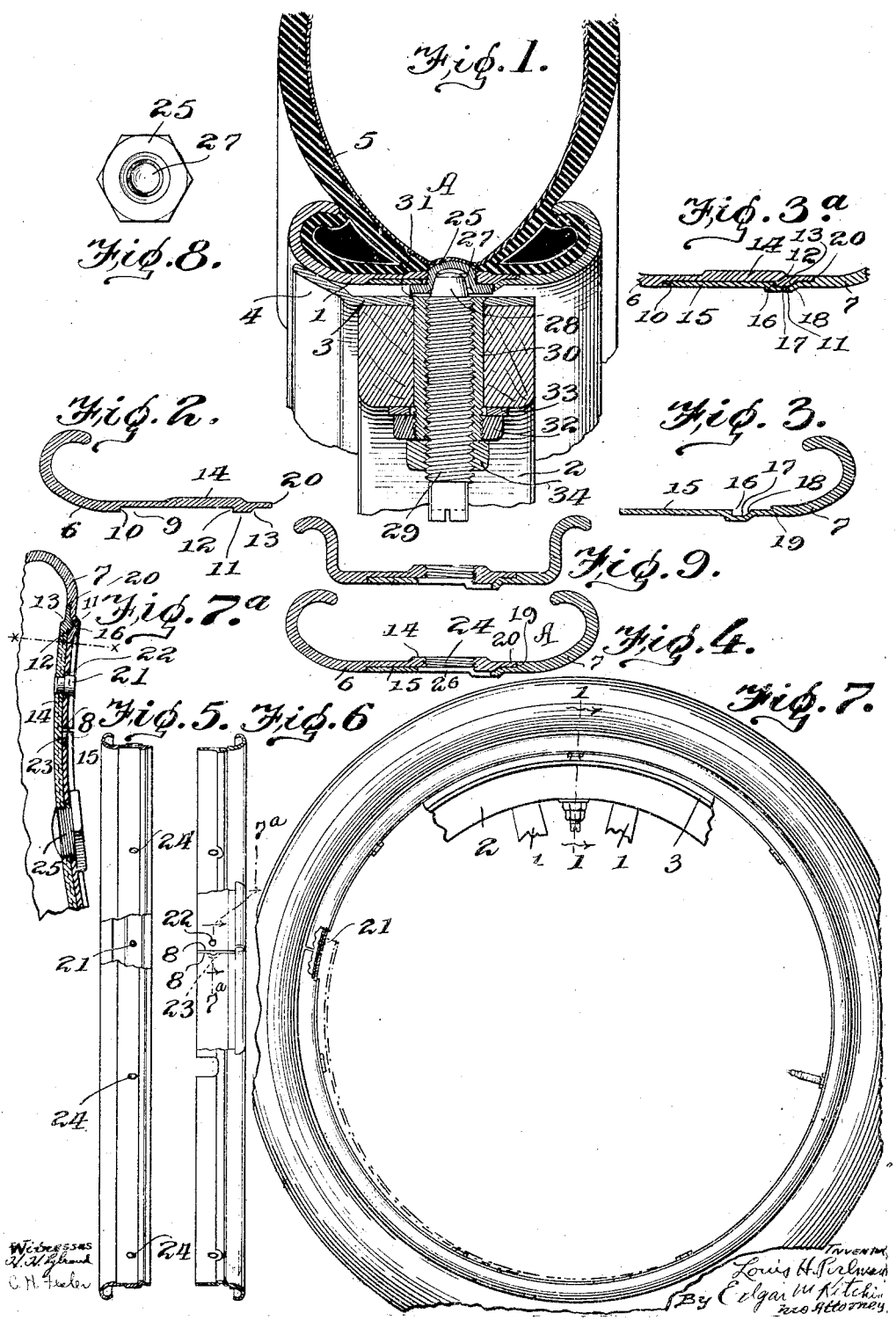

LOUIS H. PERLMAN, OF NEW YORK, N. Y.

WHEEL.

1,292,638.  Specification of Letters Patent.  Patented Jan. 28, 1919.

Application filed June 24, 1916.  Serial No. 105,690.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in wheels of the type provided with demountable rims, and more particularly to those in which the demountable rims are constructed to facilitate removal and replacement of the tire as by the detaching of one of the tire retaining flanges.

The object in view is the provision of a detachable flange section capable at one and the same time of affording the maximum amount of stress resisting capacity and a maximum efficiency in the matter of speedy and easy detachment and assemblage.

With these and other objects in view as will in part hereinafter be stated and in part become apparent, the invention comprises certain novel constructions, combinations and arrangements of parts as subsequently specified and claimed.

In the accompanying drawing—

Figure 1 is a sectional elevation of a fragment of a wheel embodying the features of the present invention, the section being taken approximately on the plane indicated by line 1—1 of Fig. 7.

Fig. 2 is a detail sectional view of that part of the main body portion of the rim, known as the main section.

Fig. 3 is a similar view of the detachable flange section.

Fig. 3ᵃ is a similar view of the two sections operatively connected, the flanges being broken away.

Fig. 4 is a similar view of the two parts in their connected operative position.

Fig. 5 and 6 are sectional elevations respectively of the main body portion of the rim and the detachable flange section thereof.

Fig. 7 is a fragmentary view in elevation of a wheel embodying the features of the present invention, parts being broken away and parts being seen in section.

Fig. 7ᵃ is an enlarged detail fragmentary section taken on the plane transversely of the axis, the parts seen being an enlarged showing of the same parts disclosed in the broken away and section line portion at the left in Fig. 7.

Fig. 8 is a top plan view of one of the recessed cap screws.

Fig. 9 is a view similar to Fig. 4 of a slightly modified embodiment.

Referring to the drawing by numerals, 1 indicates the spokes and 2, the wood felly, of an automobile wheel, which is, of course, provided with the usual hub not illustrated. Shrunk or otherwise appropriately fixed on the wood felly 2 is the felly band or fixed rim 3, having at its inner edge portion, the supporting stop flange 4 against which the demountable rim, indicated generally by the reference character A, is adapted to contact. The said demountable rim A may be of the clencher, straight side, or other known type and carries the pneumatic tire 5, the beads of which engage the retaining flanges of the rim, whether those flanges are of the clencher type as seen in Fig. 4 or of the so-called straight side type as seen in Fig. 9.

The demountable rim A is made up of two sections which for the purposes of identification will be called the main body portion 6, and the detachable flange section 7. Both the main body portion 6 and the detachable flange section 7 are rings but the detachable flange section is cross-cut, forming ends 8, 8, capable of being separated by the springing of the section 7. Such cross-cuts in demountable rim structures and annular sections thereof have become known in the art as split, and in the sense in which that word is accepted, the section 7 is split but it is believed that it is more accurately described as being cross-cut.

The main body portion 6 is formed with an annular groove 9 in its inner face, leaving a shoulder 10 at the outer edge of the groove. An annular bead 11 describes the limited width of the groove 9 inwardly. The bead 11 has its outer edge abruptly shouldered as at 12, while its inner edge is formed on an inclined shoulder 13, the said incline aiding in the assemblage of the parts as hereinafter noted, while the abrupt shoulder coöperates with a corresponding shoulder of section 7 for locking the section 7 against axial dislodgment during use. The main body portion 6 is also formed at its outer face with an annular outstanding relatively wide bead or thickened portion 14 for providing material for threads as will later become apparent. The section 7 in addition to being provided with the flange corresponding in character to the tire bead retaining flange of the main body portion 6, so as to coöperate therewith is provided with an axially extending web portion 15 corresponding generally in thickness to the depth of the groove 9 and in width to the width of said groove, so as to substantially fit the groove when the parts are assembled. The said web portion extends beyond the limits described by the said groove 9 outward to and integrally with the flange of the section 7 but is offset along a line corresponding with the shoulder 12, producing in the web 15 an annular shoulder 16 adapted to lie immediately opposite and in contact with the shoulder 12. An annular groove 17 is thus produced in the web 15, the outer edge of which is formed with an incline 18, corresponding with the incline shoulder 13, the groove 17 opening outward in the web 15 and being of a width and depth substantially equal to the width and thickness of the bead 11. Outward beyond the groove 17, the web 15 joins the flange portion or section 7 with a shoulder 19 corresponding in depth to the thickness of the inner edge portion 20 of the main body portion 6 of the demountable rim so that when the parts are assembled, they fit together after the manner indicated in Figs. 4 and 9. It is apparent, of course, that while the section 7 is usually sprung in place, as will hereinafter be pointed out, if at any time, the inner edge of the web 15 is caused to contact with the inclined shoulder 13 during axial movement of the section 7, the said inclined shoulder will facilitate the springing of the web into place. The main body portion 6 is provided with a fixed pin or lug 21 adapted to enter a recess or aperture 22 formed in the section 7 near one end 8 thereon. The other end 8 is formed with a notch 23, undercut as clearly seen in Fig. 7ᵃ, to receive an operating tool such, for example, as a screw driver adapted to be inserted for prying the notched end inward to the dotted line position seen in Fig. 7 for facilitating disconnection of the section 7 from the main body portion 6 of the demountable rim.

At preferably approximately uniformly spaced intervals about the periphery of the section 6 said section is formed with radial apertures 24 extending through the bead or thickened portion 14 and threaded to receive cap screws 25. The screws 25 in each instance extend through a preferably smooth aperture 26 formed in web 15 to correspond to and register with the respective aperture 24. The said cap screws thus hold the web 15 and accordingly the entire section 7 against being sprung radially independently of the body portion 6, whereby the latch formed by the bead 11 engaging groove 17 can not be accidentally unlocked. The said cap screws 25 serve an additional function of providing receiving means for rim locking devices. To this end, each of the cap screws 25 is formed with a conical bore 27, located to receive the tapered tip 28 of a radially disposed locking bolt 29. The tip 28 is the active element of each of the locking devices and is constructed as a wedge acting on the inclined wheel of the bore 27 to thrust the demountable rim A over into supporting contact with the flange 4, and at the same time acting to press the rim A radially outward away from the body of the wheel and to tension the rim on the wheel in this position. The bolt 29 itself serves as connecting means and connector for the wedge, anchoring the wedge to the wheel and providing an easily manipulated device for effecting the desired throw of the wedge. Each bolt 29 extends radially through the wood felly 2 and fixed rim 3 of the wheel structure and to assure effective distribution of strains, an internally preferably metal sleeve 30 is anchored in the wheel body for each of the bolts 29. The method of anchorage of the sleeve 30 may vary and consists preferably of a flange 31 formed at the outer end of the sleeve overlapping a corresponding part of the fixed rim 3, while the inner end of the sleeve 30 is engaged by a nut 32 clamping a washer 33 against the wood felly 2, whereby the sleeve 30 is effectively fixed in the wheel body. A locking nut 34 is preferably provided for each bolt 29 for locking the same against accidental backing off.

The operation of the structure should be obvious and consists in backing off the several bolts 29 when the rim A is to be removed, until the wedging tips 28 are withdrawn from the line of the cap screws 25, whereupon the rim A may be readily and easily manually withdrawn. The rim is "rocked" off and the valve stem lifted out as is usual with all commercial forms of demountable rims. When the rim A is to be replaced, it is merely rocked manually over approximately into place with its inner flange portion engaging the flange 4, and the bolts 29 are then threaded outward for causing their wedges 28 to engage within the cap screws 25 for locking the rim in place.

The removal of the demountable rim A will be desirable only when some condition of the tire requires and while the rim is off of the wheel, if it is desirable to exchange tires, to do so it is only necessary to unscrew the cap screws 25, so as to leave the section 7 free to be sprung out of engagement with the main body portion 6 of the demountable rim. The operator then introduces a pry or other appropriate instrument into the aperture 23 and springs the apertured end 8 radially inward until the section 7 assumes the position indicated in dotted lines in Fig. 7, whereupon the section 7 may be readily bodily removed, the pin 21 in no way interfering with withdrawal of the section 7 as it is withdrawn with a movement which is radially inward with respect to the pin 22 at the point where the pin is located. When the old tire has been removed and the new one replaced, the section 7 is sprung back into place and the cap screws 25 are replaced as before, whereupon the rim is ready to be remounted on the wheel and locked by the locking elements described in detail.

In Fig. 9 there is indicated the same structure as seen in the other figures, varying only in the fact that the flanges are differently shaped, merely to accentuate the fact that the type of flanges is immaterial, and the invention does not reside in the particular form of flanges. Detail description is, therefore, thought unnecessary.

What I claim is:—

1. In a demountable rim, the combination with a rim section, and a detachable section, adapted to coöperate therewith, the said sections being formed with means for preventing axial separation and lock receiving means disposed to prevent radial separation.

2. In a demountable rim, the combination with a rim section, and a detachable section, the said sections having interlocking bead and groove connecting means, one of the sections being cross-cut to enable radial separation, and means extending through and connecting the sections for preventing radial separation of said sections.

3. In a demountable rim, the combination with a rim section, and a detachable section, the said sections having interlocking bead and groove connecting means, one of the sections being cross-cut to enable radial separation, and lock receiving means for preventing radial separation of said sections.

4. A demountable rim comprising a main body portion and a detachable section, the main body portion having a bead extending circumferentially, and the detachable section having a groove adapted to coöperate with and receive the bead for locking the main body portion and section against axial disconnection, and means connecting the section to the main body portion against radial separation, the said connecting means being adapted to receive locking means for retaining the rim on a wheel.

In testimony whereof I affix my signature in presence of two witnesses.

LOUIS H. PERLMAN.

Witnesses:
EMMA M. FRÜHLING,
EDGAR M. KITCHIN.